(12) United States Patent  (10) Patent No.: US 8,407,805 B2
Warrington et al.  (45) Date of Patent: Mar. 26, 2013

(54) METHOD AND SYSTEM FOR CLASSIFYING AND REDACTING SEGMENTS OF ELECTRONIC DOCUMENTS

(75) Inventors: Connor Stephen Warrington, Ottawa (CA); Regi Baby Roy, Ottawa (CA); Charles Edouard Pulfer, Ottawa (CA); Matthew Ryan McCormick, Ottawa (CA)

(73) Assignee: Titus Inc., Ottawa (CA)

( * ) Notice: Subject to any disclaimer, the term of this patent is extended or adjusted under 35 U.S.C. 154(b) by 417 days.

(21) Appl. No.: 12/715,729

(22) Filed: Mar. 2, 2010

(65) Prior Publication Data

US 2010/0229246 A1  Sep. 9, 2010

Related U.S. Application Data

(60) Provisional application No. 61/157,531, filed on Mar. 4, 2009.

(51) Int. Cl.
  *G06F 21/22* (2006.01)
  *G06F 15/16* (2006.01)
  *H04L 29/02* (2006.01)
(52) U.S. Cl. .................... 726/27; 709/206; 713/167
(58) Field of Classification Search .............. 726/26–30; 713/182–185; 707/781–788
See application file for complete search history.

(56) References Cited

U.S. PATENT DOCUMENTS

| 6,609,200 | B2 | 8/2003 | Anderson |
| 6,775,689 | B1* | 8/2004 | Raghunandan ............... 709/206 |
| 7,346,769 | B2 | 3/2008 | Forlenza |
| 7,392,289 | B2 | 6/2008 | Curry |
| 7,467,399 | B2 | 12/2008 | Nadalin |
| 7,685,645 | B2 | 3/2010 | Doyle |
| 7,958,147 | B1* | 6/2011 | Turner et al. ................... 707/783 |
| 2003/0105734 | A1 | 6/2003 | Hitchen et al. |
| 2003/0115208 | A1 | 6/2003 | Fujiwara et al. |
| 2003/0131057 | A1* | 7/2003 | Basson et al. ................. 709/206 |
| 2004/0006598 | A1 | 1/2004 | Bargagli Damm et al. ... 709/206 |
| 2004/0013302 | A1* | 1/2004 | Ma et al. ......................... 382/209 |
| 2004/0024775 | A1* | 2/2004 | Kemp ............................ 707/102 |
| 2005/0187937 | A1 | 8/2005 | Kawabe et al. |
| 2005/0251508 | A1 | 11/2005 | Shimizu |
| 2006/0075228 | A1* | 4/2006 | Black et al. .................... 713/167 |
| 2006/0085469 | A1 | 4/2006 | Pfeiffer et al. |
| 2006/0117010 | A1 | 6/2006 | Hakala |
| 2006/0224589 | A1* | 10/2006 | Rowney et al. ................... 707/9 |
| 2006/0271596 | A1 | 11/2006 | Sabsevitz et al. |
| 2007/0027873 | A1 | 2/2007 | Factor et al. |
| 2007/0094594 | A1* | 4/2007 | Matichuk et al. ............. 715/530 |
| 2007/0116281 | A1 | 5/2007 | Brown |
| 2007/0174285 | A1 | 7/2007 | Dutta et al. |
| 2007/0226174 | A1 | 9/2007 | Saito |
| 2007/0233687 | A1 | 10/2007 | Iwase |
| 2008/0062472 | A1 | 3/2008 | Garg |
| 2008/0072032 | A1* | 3/2008 | Cohen et al. ................... 713/100 |
| 2008/0104118 | A1 | 5/2008 | Pulfer |
| 2008/0114725 | A1* | 5/2008 | Indeck et al. ..................... 707/2 |
| 2008/0168135 | A1* | 7/2008 | Redlich et al. ................ 709/204 |
| 2008/0229428 | A1 | 9/2008 | Camiel |

(Continued)

*Primary Examiner* — Catherine Thiaw
*Assistant Examiner* — Don Zhao
(74) *Attorney, Agent, or Firm* — IP-MEX Inc.; Victoria Donnelly

(57) ABSTRACT

A method for classifying and redacting electronic documents, for example an email message, is described. The classification and redaction of segments of the email message are based on rules. Using the rules, multiple versions of the email message, each corresponding to recipients with specific clearance levels are generated. A selective redacting of certain segments of the email message concurrently with sending previously redacted segments of the same email message is described. A corresponding system for classifying and redacting electronic documents is also provided.

22 Claims, 12 Drawing Sheets

U.S. PATENT DOCUMENTS

| | | |
|---|---|---|
| 2008/0270807 A1 | 10/2008 | Forlenza |
| 2008/0301760 A1 | 12/2008 | Lim |
| 2009/0006851 A1 | 1/2009 | Freeman |
| 2009/0019379 A1 | 1/2009 | Pendergast |
| 2009/0030884 A1 | 1/2009 | Pulfer |
| 2009/0106271 A1 | 4/2009 | Chieu et al. |
| 2009/0254572 A1* | 10/2009 | Redlich et al. ................. 707/10 |
| 2009/0296166 A1* | 12/2009 | Schrichte ...................... 358/474 |
| 2010/0030798 A1* | 2/2010 | Kumar et al. ................. 707/102 |
| 2010/0174751 A1 | 7/2010 | Kawano et al. |
| 2010/0185676 A1 | 7/2010 | Weaver et al. |
| 2010/0313239 A1* | 12/2010 | Chakra et al. .................... 726/2 |
| 2011/0202618 A1* | 8/2011 | Kritt et al. .................... 709/206 |

\* cited by examiner (S//REL TO USA, GBR) You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly.

*Figure 3*

30 with your current document look.

(S//REL TO USA, GBR)

True Labs Portion Marking (S//REL TO USA, GBR)
Edit Portion Mark...
Delete Portion Mark...
Remove this Smart Tag
Stop Recognizing "(S//REL TO USA, GBR)"
Smart Tag Options...

matting of selected text in the document text by Styles gallery on the Home tab. You can also format e tab. Most controls offer a choice of using the look pecify directly.

se new Theme elements on the Page Layout tab. To use the Change Current Quick Style Set command. provide reset commands so that you can always restore the look of your document to the original contained in your current template.

METHOD AND SYSTEM FOR CLASSIFYING AND REDACTING SEGMENTS OF ELECTRONIC DOCUMENTS

RELATED APPLICATIONS

The present application claims benefit from the U.S. provisional application Ser. No. 61/157,531 for "Methods for Classifying and Redacting Portions of Email Messages" filed on Mar. 4, 2009, the entire contents of which are incorporated herein by reference.

FIELD OF INVENTION

The invention relates to information classification and policy enforcement systems, and in particular to a method and system for classifying segments of documents, including email messages, and transforming the documents according to a predefined set of rules.

BACKGROUND OF THE INVENTION

Documents, including email messages, generated by employees in an organization often contain sensitive information that should be made available only to a selected set of recipients who are authorized to view such information.

Consider, for example, an email message generated by an employee in a company. The email message typically includes the employee number and a name of a department where the employee works. Recipients of the email message may include other employees in the company, as well as certain customers of the company. Both categories of the recipients may have different requirements regarding sensitive information contained in the email message.

Classifying email messages and ensuring that only authorized persons are given access to the sensitive information contained in the email messages is important to the appropriate functioning of the organization. Message classification has a number of advantages that include the following:

It provides user accountability;
It reduces the disclosure of sensitive information to unauthorized persons;
It facilitates the enforcement of rules regulating the email message distribution for the organization; and
It enables the use of security technology to redact sensitive parts of an email message sent to a recipient that does not have the right to view such information.

The classification of segments of email messages, to be also referred to as portions in this patent application, has been a requirement in military and government environments for many years. The classification requirements have been set out by certain organizations, such as the US Department of Defense Controlled Access Program Office (CAPCO). Up to this point in time, such classification has been performed manually by inserting appropriate classification marks to a chosen segment of an email message. The whole process of inserting marks is labor intensive, tedious, and prone to errors, since users have to type each mark in a proper format.

Therefore there is a need in the industry for developing an improved process for classifying and redacting segments of electronic document, including email messages.

SUMMARY OF THE INVENTION

Therefore it is an objective of the invention to provide an improved method and system for classifying and redacting segments of electronic document, including email messages, which would avoid or mitigate the disadvantages of the prior art.

According to one aspect of the invention, there is provided a computerized method for classifying segments of a document and prohibiting access to classified segments of the document by an unauthorized recipient of the document, the method comprising:
(a1) introducing a set of classification options, each classification option characterizing a type of information contained in a segment of the document;
(b1) for each segment to be classified, specifying a classification from the set of classification options;
(c1) marking said each segment to be classified in accordance with a respective classification option, producing a marked segment;
(d1) classifying the document based on the classifications of the segments of the document; and
(e1) generating one or more versions of the document based on a clearance level of the recipient of the document, the clearance level determining a type of information the recipient with said clearance level is entitled to access.

In one embodiment of the invention, the document is an email message.

In the method described above, the step (e1) comprises:
(a3) selectively redacting marked segments of the email message in real time, based on the clearance level of the recipient of the email message producing a redacted email message; and
(b3) sending the redacted email message to the recipient of the email message.

The step (e1) further comprises determining the clearance level of the recipient of the email message by applying a set of rules.

The step (a3) comprises:
(a5) ordering recipients of the email message in a hierarchy in accordance with their respective clearance levels such that a recipient with a higher clearance level occupies a higher level in the hierarchy in comparison to a recipient with a lower clearance level; and
(b5) redacting the marked segments incrementally, comprising redacting the marked segments for the recipients in a particular level in the hierarchy prior to the redacting the marked segments for the recipients at an immediate lower level in the hierarchy.

The step (e1) comprises sending the email message for the recipients in said particular level in the hierarchy concurrently with the redacting the marked segments for the recipients at the immediate lower level in the hierarchy.

In an alternative embodiment of the invention, the step (b1) comprises:
(a7) analyzing contents of the email message by using an artificial intelligence system; and
(b7) automatically classifying the segments of the email message based on results of the analysis performed in the step (a7).

The step (a3) is performed concurrently with writing the email message by a sender of the email message.

In another embodiment of the invention, the method further comprises:
(a9) introducing a set of rules for mapping a category of the recipient of the email message to the clearance level of the recipient, the category characterizing a company and a group within the company to which the recipient belongs; and
(b9) determining the clearance level of the recipient by using the set of rules.

According to another aspect of the invention, there is provided a computer readable storage medium, having a computer readable program code instructions stored thereon, which, when executed by a computer, perform the following steps:
(a10) introducing a set of classification options, each classification option characterizing a type of information contained in a segment of the document;
(b10) for each segment to be classified, specifying a classification from the set of classification options;
(c10) marking said each segment to be classified in accordance with a respective classification option, producing a marked segment;
(d10) classifying the document based on the classifications of the segments of the document; and
(e10) generating one or more versions of the document based on a clearance level of the recipient of the document, the clearance level determining a type of information the recipient with said clearance level is entitled to access.

According to yet another aspect of the invention, there is provided a system for classifying segments of a document and prohibiting access to classified segments of the document by an unauthorized person, the system comprising:
a processor, and a computer readable storage medium having computer readable instructions stored thereon, which, when executed by the processor, form the following:
(a11) a classification option storage module, storing a set of classification options, each classification option characterizing a type of information contained in a segment of the document;
(b11) a segment specification module, specifying for each segment to be classified, a classification from the set of classification options;
(c11) a segment marking module, marking said each segment to be classified in accordance with a respective classification option, producing a marked segment;
(d11) a document classification module, classifying the document based on the classifications of the segments of the document; and
(e11) a document generation module, generating one or more versions of the document based on a clearance level of a recipient of the document, a clearance level determining a type of information the recipient with said clearance level is entitled to access.

In one embodiment of the invention, the document is an email message.

The document generation module (e11) comprises:
(a13) a redaction module, selectively redacting marked segments of the email message in real time, based on the clearance level of the recipient of the email message, producing a redacted email message; and
(b13) a sender module, sending the redacted email message to the recipient of the email message.

The document generation module (e11) further comprises a clearance level computation module, determining the clearance level of the recipient of the email message by applying a set of rules.

The redaction module (a13) comprises:
(15a) an ordering module, ordering recipients of the email message in a hierarchy in accordance with their respective clearance levels such that a recipient with a higher clearance level occupies a higher level in the hierarchy in comparison to a recipient with a lower clearance level; and
(15b) a segment redaction module redacting the marked segments incrementally, comprising redacting the marked segments for the recipients in a particular level in the hierarchy prior to the redacting the marked segments for the recipients at an immediate lower level in the hierarchy.

The document generation module (e11) also comprises computational means for sending the email message for the recipients in said particular level in the hierarchy concurrently with the redacting the marked segments for the recipients at the immediate lower level in the hierarchy.

The segment specification module (b11) comprises:
(a17) a document analysis module, analyzing contents of the email message by using an artificial intelligence system; and
(b17) an auto-classification module, automatically classifying the segments of the email message based on results of the analysis performed by the artificial intelligence system.

In another embodiment of the invention, the document generation module (e11) comprises:
(a18) another redaction module, selectively redacting marked segments of the email message in real time, based on the clearance level of the recipient of the email message producing a redacted email message, the redacting being performed concurrently with writing the email message by a sender of the email message; and
(b18) a sender module, sending the redacted email message to the recipient of the email message.

The clearance level computation module comprises:
(a19) a rules storage module storing a set of rules for mapping a category of the recipient of the email message to the clearance level of the recipient, the category characterizing a company and a group within the company to which the recipient belongs; and
(b19) computational means for determining the clearance level of the recipient by using the set of rules.

In an alternative embodiment of the system, the processor is a multicore processor with each core generating a different version of the document.

Thus, an improved method and system for classifying and redacting segments of electronic documents have been provided.

BRIEF DESCRIPTION OF THE DRAWINGS

Further features and advantages of the invention will be apparent from the following description of the embodiment, which is described by way of example only and with reference to the accompanying drawings, in which:

FIG. 3 illustrates the insertion of a marking corresponding to the selected classification into the email message;

FIG. 4 illustrates a selection dialog allowing a sender of the email message to modify and delete existing labels (markings) for segments of the email message;

DETAILED DESCRIPTION OF THE EMBODIMENTS OF THE INVENTION

Glossary

Figure 1:
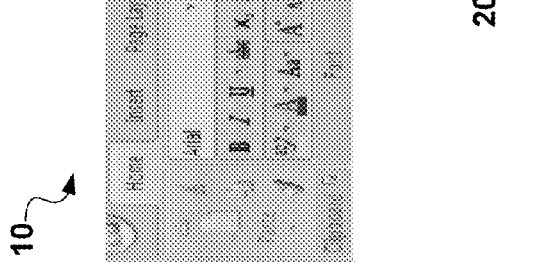
FIG. 1 illustrates a graphical user interface, showing a toolbar including a portion marking button for selecting and marking a segment (portion) of an email message.

Category characterizes a company and a group within the company to which the recipient belongs Classification option characterizes a type of information contained in a segment of the document Clearance level indicates a type of information the recipient with said clearance level is entitled to access Rules map a category of the of the recipient of the email message to the clearance level of the recipient The present invention concerns classifying and redacting segments of electronic documents, for example email messages, for protecting sensitive information of an organization. Depending on the type of information contained in a segment of an email message, only a certain subset of the recipients that are authorized to receive such information are able to view the segment of the email message that is redacted from the email message that is received by all other recipients. The method of the embodiments of the invention provide an add-on utility for an existing email systems, such as Microsoft Outlook, to help users protect information according to a predetermined set of rules. The rules determine whether a particular segment of the email message can be forwarded or disclosed to a given set of recipients. An exemplary set of rules, SR1 that is used by an embodiment of the invention is presented next.

Rule #1: Secret information, such as plans to penetrate certain segments of a market, should be circulated only among executives of a company;

Rule #2: Confidential information, such as list of suppliers, should be circulated only among the employees of the procurement group of a company;

Rule #3: Information for internal use in the company, such as the list of employees, should not be made available for non-employees of a company, such as contractors;

Rule #4: Public information, such as list of products and their respective features should be freely available to anyone;

Rule #5: Social insurance number (SIN) of an employee can be made available only to a governmental organization, such as Canadian Custom and Revenue Agency (CCRA) and the human resources department of the company;

Various different sets of rules that are appropriate for different organizations can be used, and embodiments of the invention can be practiced with various electronic documents management system, and an email system other than Microsoft Outlook, or even as a self-contained standalone system.

Consider, for an example email message, containing two segments of the email message, the first segment of the email message containing publicly available information, and the second segment containing the SIN of an employee of a company. In accordance with the set of rules SR1 only the second segment is sensitive and needs to be protected (Rule #5), whereas the rest of the email message can be freely disclosed.

This information is provided by the sender of the email message (user) in the embodiments of the invention that allow the sender to classify segments of an email message such as a paragraph, a sentence, a table, according to a predetermined set of designations or classifications including "UNCLASSIFIED", "FOR INTERNAL USE", "PRIVATE", "CLASSIFIED", "CONFIDENTIAL", and "SECRET". This is achieved by inserting labels or markings that represent a classification of a chosen segment of the email message, which has not been classified yet. A marking is inserted at the beginning of the respective segment of the email message. For example, if a paragraph in the exemplary email message contains secret information, such as the SIN of an employee, and is classified "SECRET" by the sender of the email message, the marking containing a string "(S)" is inserted at the beginning of the paragraph.

In order to insert a marking, a user selects the "Portion Marking" button from the toolbar illustrated in diagram 10 of FIG. 1, or by right clicking on the text at the beginning of the segment of the email message to be classified and selecting "Add Portion Mark". In response, a selection dialog box pops up in a separate window, allowing the selection of the appropriate classification as illustrated in diagram 20 of FIG. 2. Once the selection is made, the marking corresponding to the classification, in this case, "(S//REL TO USA,GBR)" to satisfy US Controlled Access Program Coordination (CAPCO) standard, is inserted into the email message at the beginning of the classified segment of the email message as illustrated by diagram 30 of FIG. 3.

Figure 2:
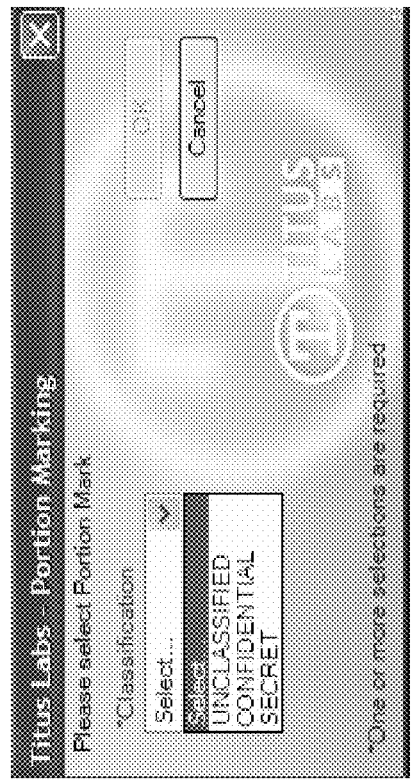
FIG. 2 illustrates a selection dialog appearing in a separate window allowing a sender of the email message (user) to select an appropriate classification.

The embodiments of the invention also allow users to modify and delete existing markings by right clicking on a desired marking. The resulting popup dialog window allows the user to select an appropriate option as illustrated by diagram 40 of FIG. 4. For example, if the classification of a paragraph needs to be changed from "SECRET" to "CONFIDENTIAL", the option "Edit Portion mark" shown on the FIG. 4 is selected. This brings forward yet another selection window that is shown in FIG. 2. Selecting option "CONFIDENTIAL" results in the string "(S)" at the beginning of the paragraph shown on FIG. 3 being changed to the string "(C)".

Similarly, if the paragraph classified as "SECRET" is deemed to lose all of its secret components, the option "Delete Portion mark" shown in FIG. 4 is selected, resulting in the string "(S)" at the beginning of the paragraph being deleted altogether.

After all the desired segments of the email message are classified or re-classified as required, the system automatically determines classification for the whole email message, based on the classification of its segments, and generates a version of the email message, depending on the rules and the recipient's entitlement to the different parts of the information. For example, if the email message was originally classified as "UNCLASSIFIED", but later a segment classified as "SECRET" has been added, the email message classification is automatically upgraded by the invention to "SECRET". This is also true when drag and drop feature is used. If a segment of the email message is copied from an existing email message into a new email message, the existing marking for the segment will also be copied into the new email message. The new email message's classification may be updated based on the marking of the segment of the email message added during the drag and drop. The entitlement of the recipient to the different segments of the email message is determined by a clearance level of the recipient. The clearance level determines type of information the recipient with the given clearance level is entitled to access. Thus, a segment with SECRET classification can be viewed by the recipient only if the clearance level of the recipient is high enough to view such information. The clearance level of the recipient is determined by using the set of rules discussed earlier.

If the email message is to be sent to several recipients with different classification levels, and whose entitlement to view information is governed by different rules, the system generates different versions of the email message, by automatically redacting out (excluding) the sensitive segments of the email message to which a recipient is not entitled. For example, if the exemplary email message needs to be sent to the CCRA and to an employee of the procurement group, the CCRA version of the email message would contain all the paragraphs, including the segment of the email message with the SIN (see Rule #5), while the procurement group version of the email message would contain all the segments of the email message excluding the segment of the email message with the SIN (see Rule #4).

In another embodiment of the invention, the set of rules, SR2, differs from the SR1 described earlier by including an additional Rule #6:

Rule #6: The entire email message is classified by using the classification of the most restrictive segment of the email message.

In this case, the procurement group version of the exemplary email message would contain no paragraphs (see Rule #6), and therefore would not be sent at all.

In yet another embodiment of the invention, the email message is formatted in Extensible Markup Language (XML). In this case, the markings are represented in XML format in the email message internals by adding XML metadata that represent the markings. The content of the email message is automatically modified to conform to a particular classification. For instance, if a sender of the email message wants to redact out the "SECRET" segments of an email message in order to end up with an "UNCLASSIFIED" email, the method of the embodiments of the invention automatically removes all the "SECRET" segments from the email.

The systems of the embodiments of the invention are described next. Each of the systems of the embodiments of the invention shown in FIG. 5(a), FIG. 5(b), FIG. 5(c), FIG. 5(d) and FIG. 5(e) include a general purpose or specialized computer having a central processing unit (CPU), or processor, and a computer readable medium, e.g., memory, DVD, CD-ROM, floppy disk, flash memory, magnetic tape or other storage medium, having computer readable instructions stored thereon for execution by the CPU, to form various modules of the systems of the embodiments of the invention as will be described in detail below. Alternatively, the system can be implemented in firmware, or a combination of firmware and a specialized computer having a computer readable storage medium.

Figure 5A:
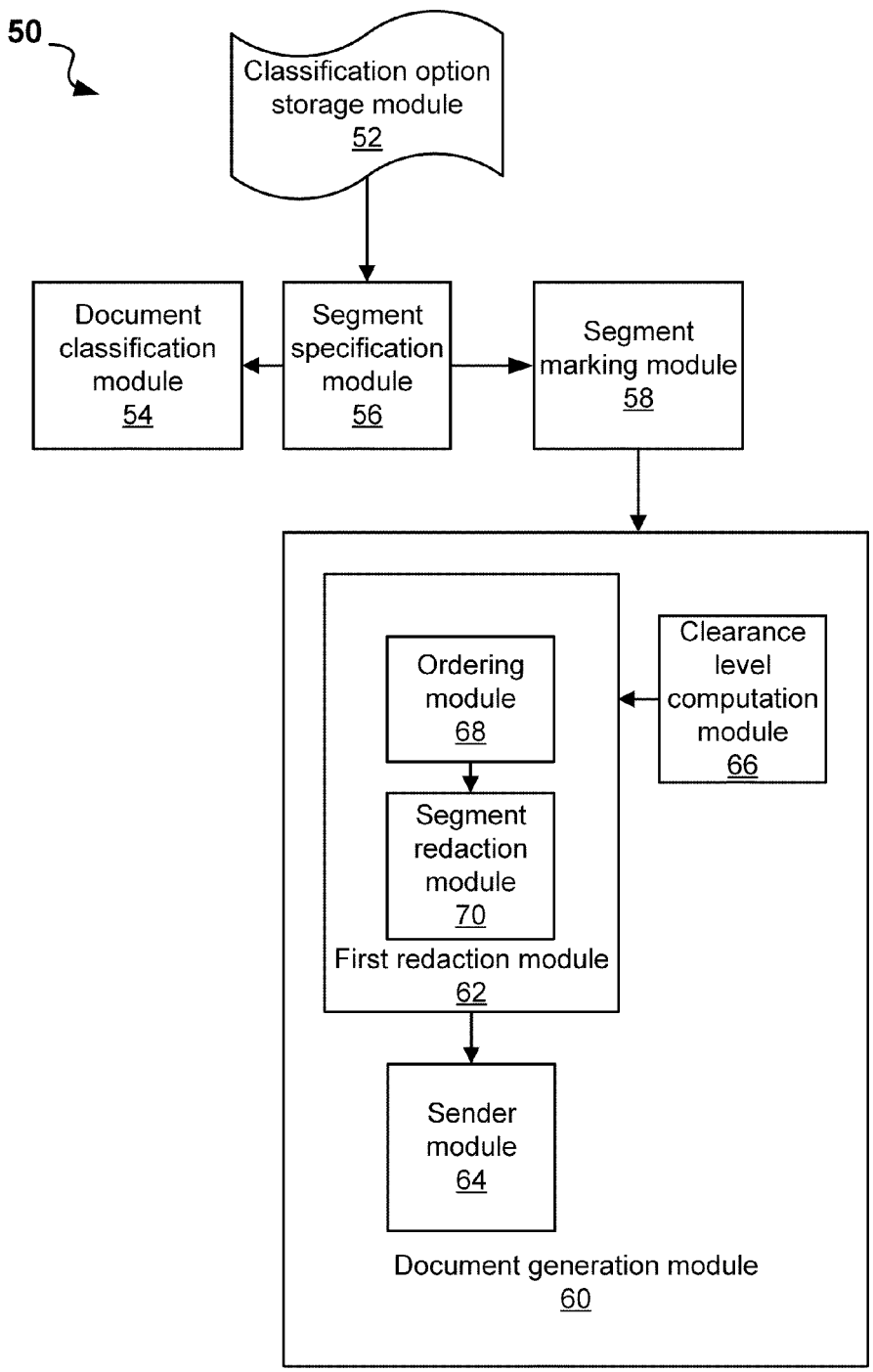
FIG. 5(a) shows a system 50 for classifying and redacting segments of an email message according to the embodiments of the invention.

The structure of a system for classifying and redacting segments in email messages according to the embodiment of the invention is described in more detail with regard to FIG. 5(a).

The system 50 comprises a Classification option storage module 52, a Document classification module 54, a Segment specification module 56, a Segment marking module 58 and a Document generation module 60. The Classification option storage module 52 stores a set of classification options, each classification option characterizing a type of information contained in a segment of the document, an email message for example. An output of the Classification option storage module 52 is supplied to an input of the Segment specification module 56, which specifies for each segment to be classified, a classification from the set of classification options. The output of the Segment specification module 56 forms the input for the Document classification module 54 that classifies the document based on the classifications of the segments of the document and for the Segment marking module 58 that performs marking of each segment to be classified in accordance with a respective classification option, producing a marked segment. The output of the Segment marking module 58 is processed by the Document generation module 60.

The Document generation module 60, in turn, includes a First redaction module (also to be referred to as a redaction module) 62, a Sender module 64 and a Clearance level computation module 66. The Clearance level computation module 66 determines the clearance level of the recipient of the email message by applying a set of rules, and its output is forwarded to the First redaction Module 62. The First redaction module 62 selectively redacts marked segments of the document, e.g. the email message, in real time, based on the clearance level of the recipient of the email message, producing a redacted email message. The resulting redacted email message is sent by the Sender module 64 to the recipient of the email message.

The First redaction module 62 includes an Ordering module 68 and a Segment redaction module 70. The Ordering module 68 orders recipients of the email message in a hierarchy in accordance with their respective clearance levels such that a recipient with a higher clearance level occupies a higher level in the hierarchy in comparison to a recipient with a lower clearance level. The output of this module is used by the Segment redaction module 70, which redacts marked segments incrementally, comprising redacting the marked segments for the recipients in a particular level in the hierarchy prior to the redacting the marked segments for the recipients at an immediate lower level in the hierarchy.

Figure 5B:
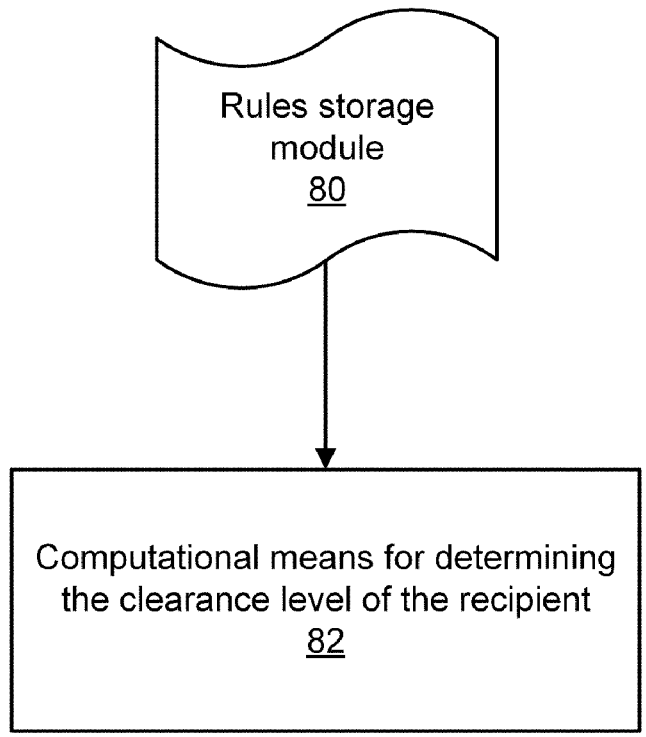
FIG. 5(b) shows the Clearance level computation module 66 of FIG. 5(a) in more detail.

The components of the Clearance level computation module 66 are displayed in more detail with regard to FIG. 5(b). These include a Rules storage module 80 that stores a set of rules for mapping a category of the recipient of the email message to the clearance level of the recipient. The category characterizes a company and a group within the company to which the recipient belongs. The rules are used by the computational means 82 for determining the clearance level of the recipient.

Figure 5C:
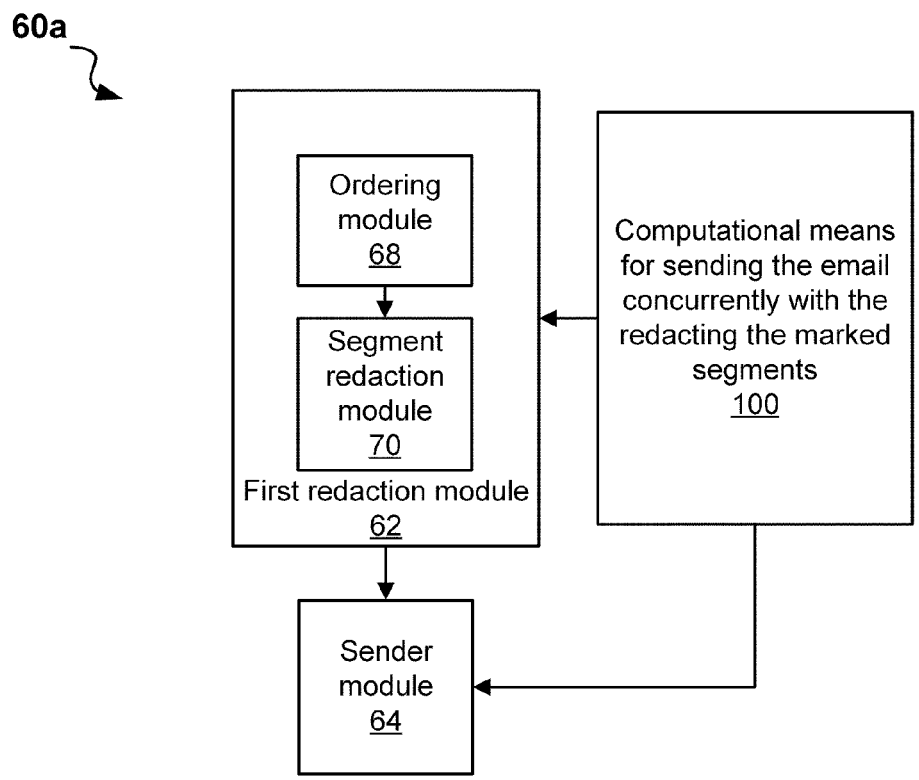
FIG. 5(c) illustrates one implementation 60a for the Document generation module 60 of FIG. 5(a)

FIG. 5(c) illustrates one implementation 60a of the Document generation module 60 of FIG. 5(a), including the First redaction module 62 and the Sender module 64 described earlier. Computational means for sending the email concurrently with the redacting the marked segments 100 provides the functionality required for sending the email message for the recipients in the particular level in the hierarchy concurrently with the redacting the marked segments for the recipients at the immediate lower level in the hierarchy.

Figure 5D:
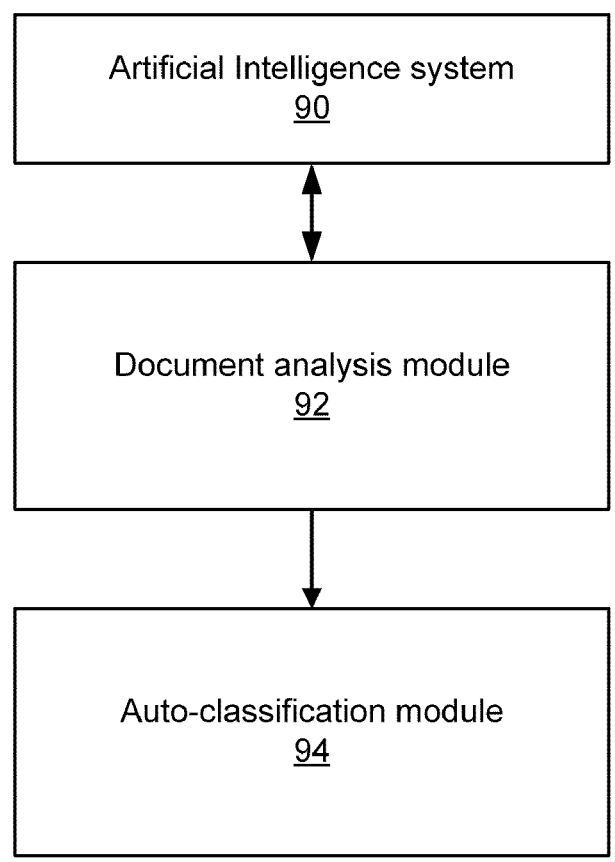
FIG. 5(d) shows the Segment specification module 56 of FIG. 5(a)
Figure 5E:
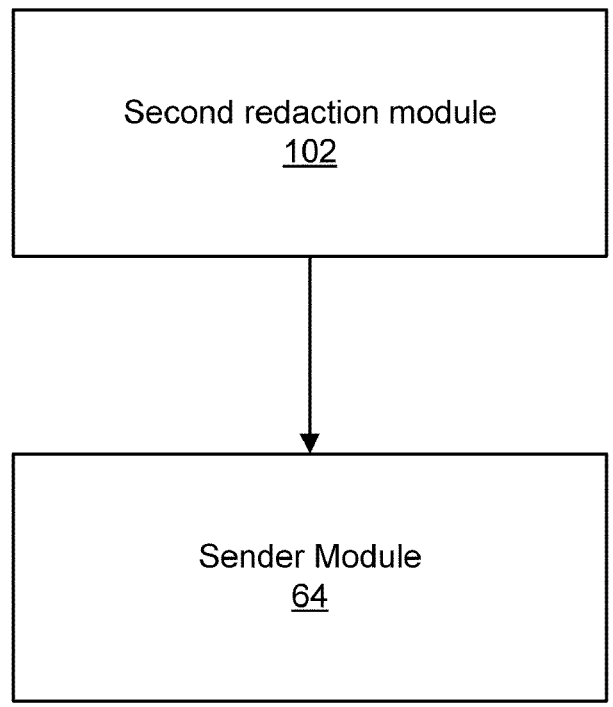
FIG. 5(e) illustrates another implementation 60b for the Document generation module 60 of FIG. 5(a)

FIG. 5(d) shows the Segment specification module 56 in more detail, comprising an Artificial Intelligence (AI) system 90, a Document analysis module 92 and an Auto-classification module 94. The AI system 90 may be conveniently a decision tree AI based system, comprising decision nodes and conclusion nodes, each decision node having outcomes, connecting the decision node to another decision node or to the conclusion node. The AI system of the embodiments of the invention compares a word in the email message with a predetermined list of words, or combinations thereof, including their synonyms, and makes a decision based on a match, or a degree of the match, between the word and the predetermined list of words. Based on the analysis performed by the AI system, it is decided whether or not the word should be classified.

The Document analysis module 92 analyzes contents of the email message by using the AI system 90. The output of the Document analysis module 92 is forwarded to the Auto-classification module 94 that automatically classifies the segments of the email message based on results of the analysis performed by the AI system 90.

Another implementation 60b for the Document generation module 60 of FIG. 5(*a*), allowing to speed up the operations of the AI-based system 90, is presented in FIG. 5(*e*). The Document generation module 60b comprises a Second redaction module, to be also referred to as another redaction module, 102, the output of which is used by the Sender module 64 that was described earlier. The Second redaction module 102 selectively redacts marked segments of the email message in real time, based on the clearance level of the recipient of the email message producing a redacted email message, the redacting being performed concurrently with writing the email message by a sender of the email message.

All the modules of the system illustrated in FIGS. 5(*a*) to 5(*e*) and including modules 54, 56, 58, 60, 62, 64, 66, 68, 70, 90, 92, 94, and 102 include a firmware or, alternatively, computer readable instructions stored in a computer readable storage medium for execution by a processor. The Classification options storage module 52 and the Rules storage module 80 comprise computer readable data that are stored in a computer readable storage medium for execution by a processor. The computational means 82 and 100 also comprise computer readable code performing methods, procedures, functions or subroutines, which are stored in a computer readable storage medium, to be executed by a CPU.

Figure 6:
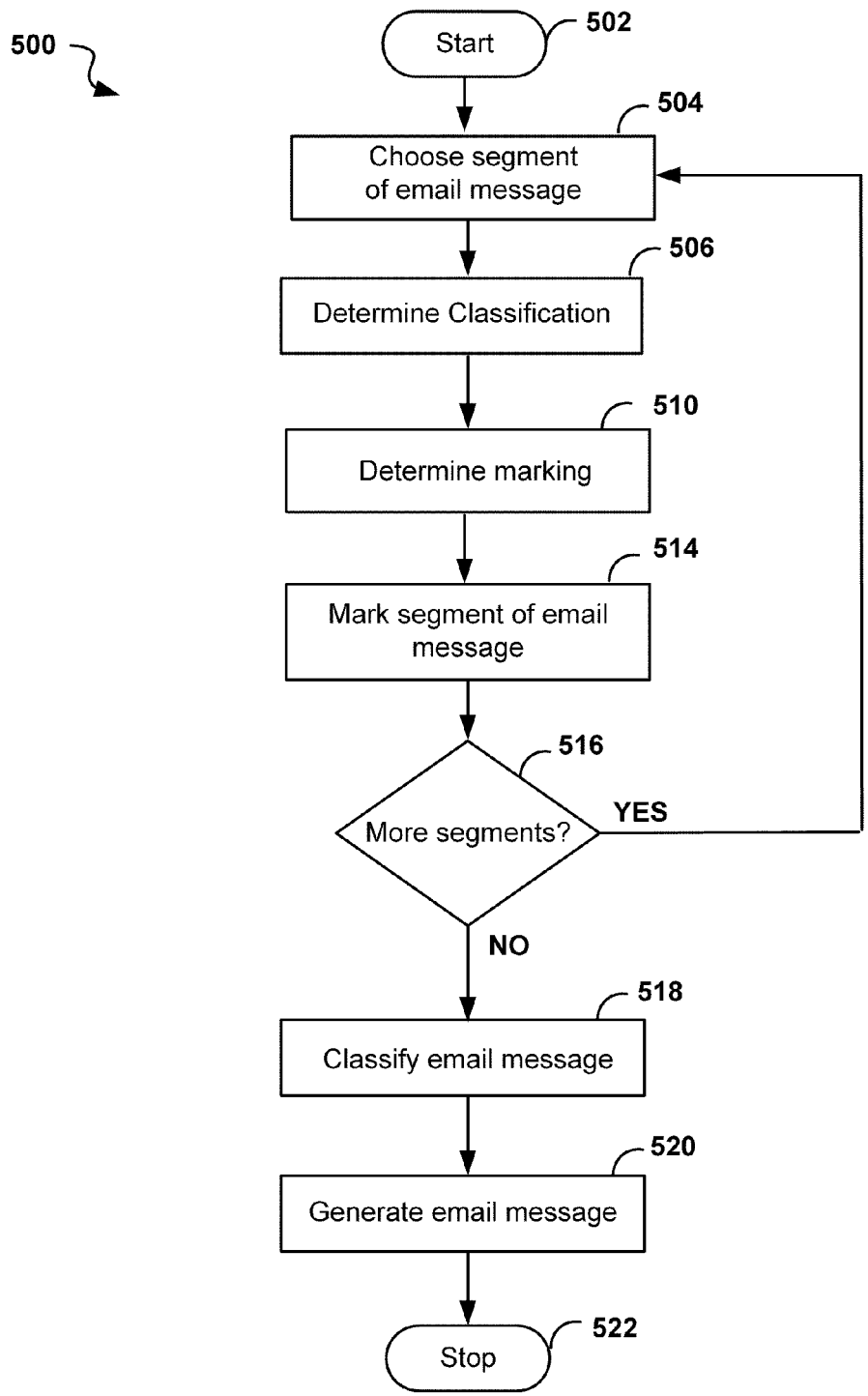
FIG. 6 shows a flowchart 500 illustrating a method for classifying segments of an email message according to the embodiments of the invention.

FIG. 6 shows a flowchart 500 illustrating a method for classifying segments of an email message according to the embodiments of the invention. Upon start (box 502), a segment of the email message that needs to be classified is chosen (box 504), followed by determining the classification of the segment of the email message (box 506) from the classification options (stored in the Classification option storage module 52) available to the sender of the email message. Once the segment of the email message is classified, the marking corresponding to the classification is determined (box 510), and the segment of the email message is marked accordingly (box 514) producing a marked segment. In the next step the procedure 500 checks whether there is any further segment to be classified (box 516). If so, the procedure 500 exits 'YES' from box 516 and loops back to the entry of box 504. Otherwise, the procedure 500 exits 'NO' from box 516. The complete email message is then classified based on the classified segments of the email message (box 518). In the next step, the procedure 500 generates one or more versions of the email message (box 520) and exits (box 522). Each version of the email message is for one or more recipients with a specific clearance level.

Figure 7:
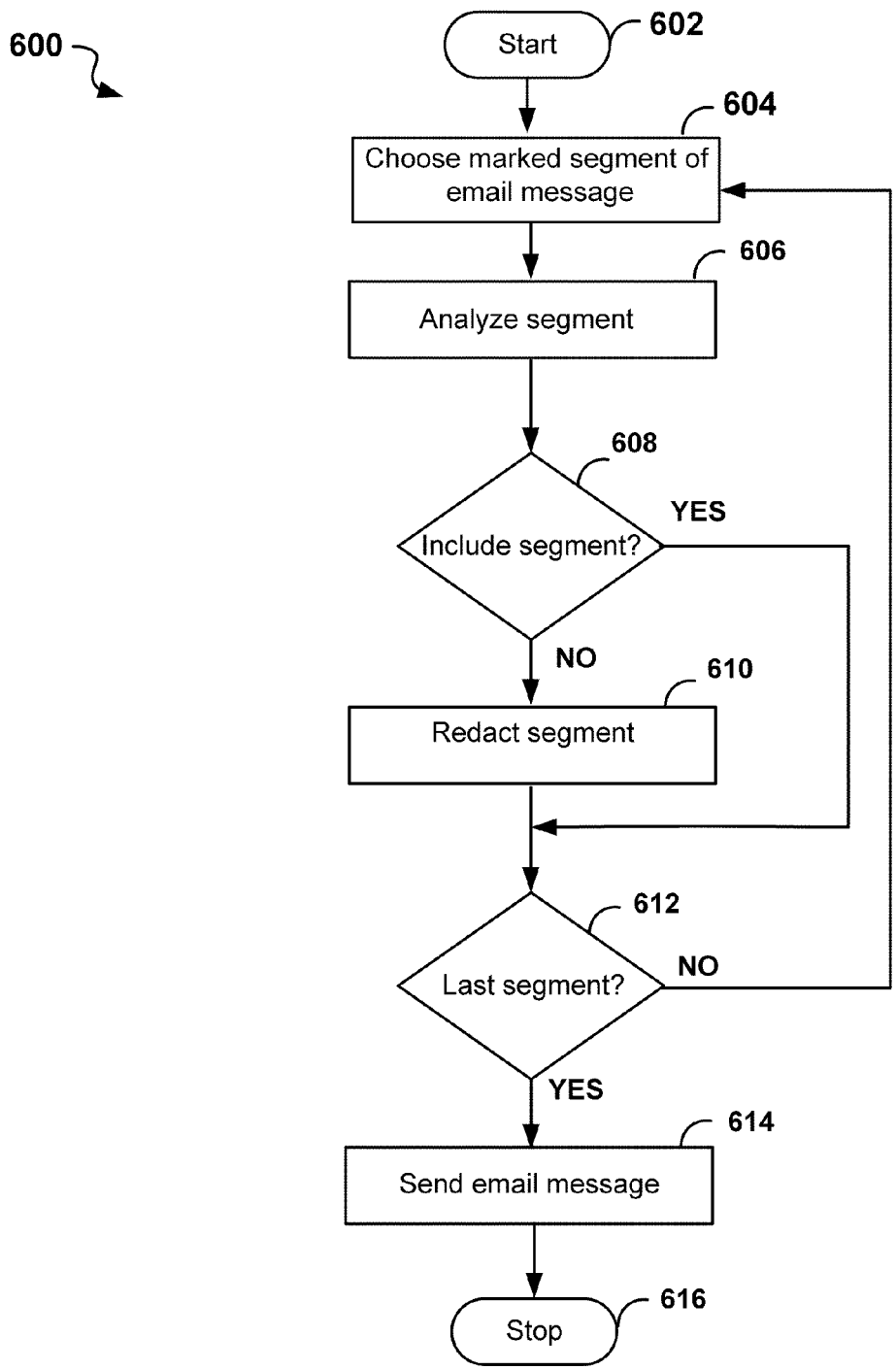
FIG. 7 illustrates the step 520 "Generate email message" of FIG. 6 in more detail.

FIG. 7 presents flowchart 600 illustrating the step 520 "Generate email message" of FIG. 6 in more detail. Upon start (box 602), a marked segment of the email message is chosen (box 604) and analyzed (box 604) by using the set of rules stored in the Rules storage module 80. In the next step, the procedure 600 checks whether the segment is to be included in a redacted email message (box 608). If so, the procedure 600 exits 'YES' from box 608, skips box 610 and goes to the entry of box 612. Otherwise, the procedure exits 'NO' from box 608 and redacts the segment from the email message (box 610). Whether or not the processed segment was the last classified segment is checked next (box 612). If not, the procedure exits 'NO' from box 612 and proceeds to the entry of box 604. Otherwise, the procedure 600 sends the redacted email message (box 614) and exits (box 616).

As discussed earlier, one form of the modified email message is a redacted email message, in which certain segments have been removed because of confidentiality considerations. The segment to be redacted depends on the clearance level of the recipient of the email message. This procedure 600 of FIG. 7 can also be used to generate different email messages for each recipient on the to: or bcc: lines of the email message. For example, the sender of the email message may want to send to four recipients, one recipient is cleared for SECRET information, the second is cleared for CONFIDENTIAL and the remaining two are cleared for UNCLASSIFIED. When the an email message is sent with SECRET and CONFIDENTIAL segments, redaction can be invoked as an option to generate and send three different versions of the email message, the first for the recipients with a clearance level that allow them to view segments with a SECRET classification, a second for the recipients with a clearance level that allow them to view segments with a CONFIDENTIAL classification and a third for the recipients with a clearance level that allow them to only view segments with an UNCLASSIFIED classification. The second email message would have all segments with SECRET information automatically redacted. The third email message would have all segments with SECRET and CONFIDENTIAL classification automatically redacted. This is all done automatically by the methods and the system of FIGS. 5(*a*) to 5(*e*) described above.

Figure 8:
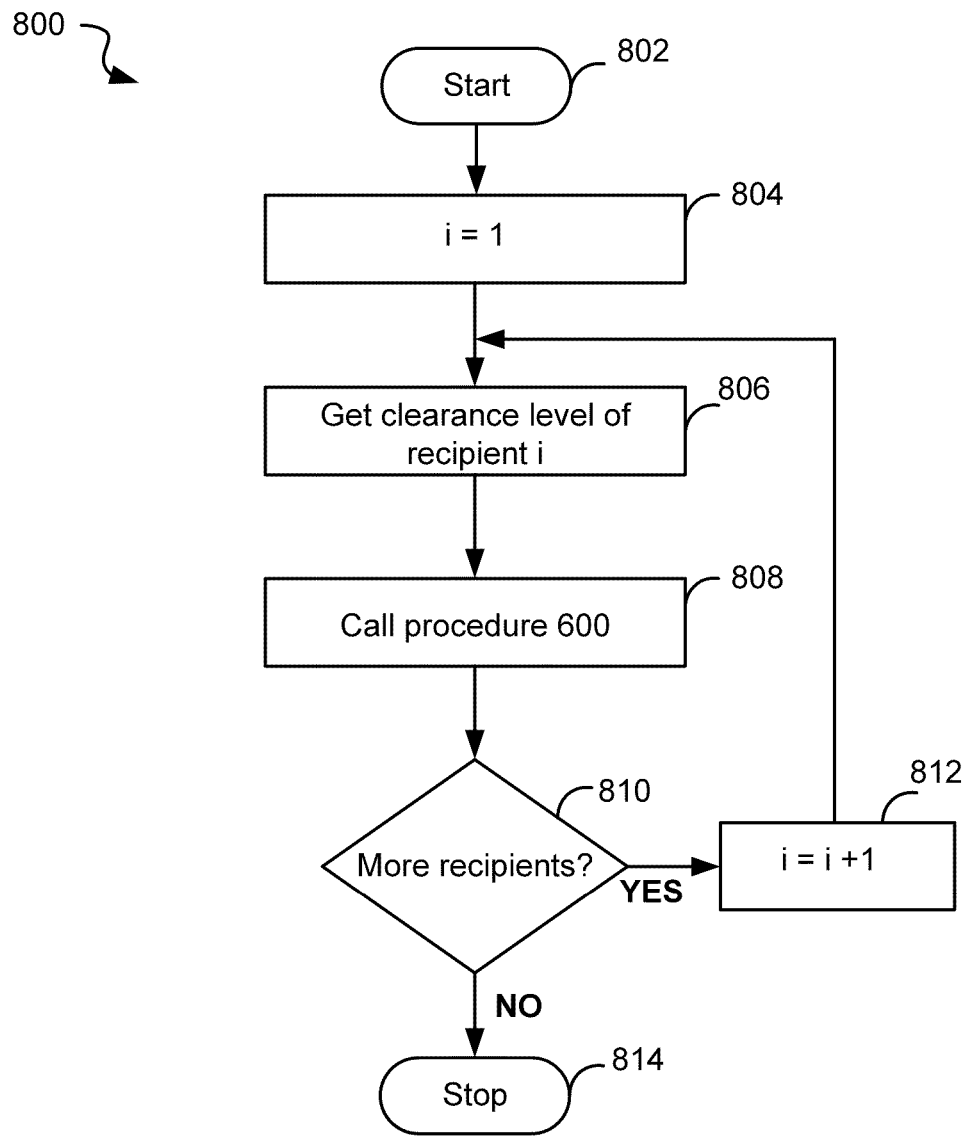
FIG. 8 shows a flowchart illustrating a method for handling multiple recipients of the email message.

The method of sending email messages to multiple recipients is explained with the help of flowchart 800 displayed in FIG. 8. Upon start (box 802), the procedure 800 sets the value of variable i to 1 (box 804) and loads the classification of recipient i (box 806). Procedure 600 is then called to generate an email message for recipient i (box 808). Whether there are more recipients to process is checked (box 810). If so, the procedure 600 exits 'YES' from box 810, increments i by 1 (box 812) and loops back to the entry of box 806. Otherwise, the procedure 800 exits (box 814). Each recipient "I" is assumed to be characterized by a distinct clearance level. For multiple recipients with the same clearance level, recipients with the same clearance level can be batched together and the same version of the email message is sent to all the recipients in the batch.

Redaction of segments of the email message can be time consuming and can significantly increase the generation of email messages for multiple recipients with various different clearance levels. An alternate embodiment of the invention speeds up the operation, by using a multi-level redaction process.

Figure 9:
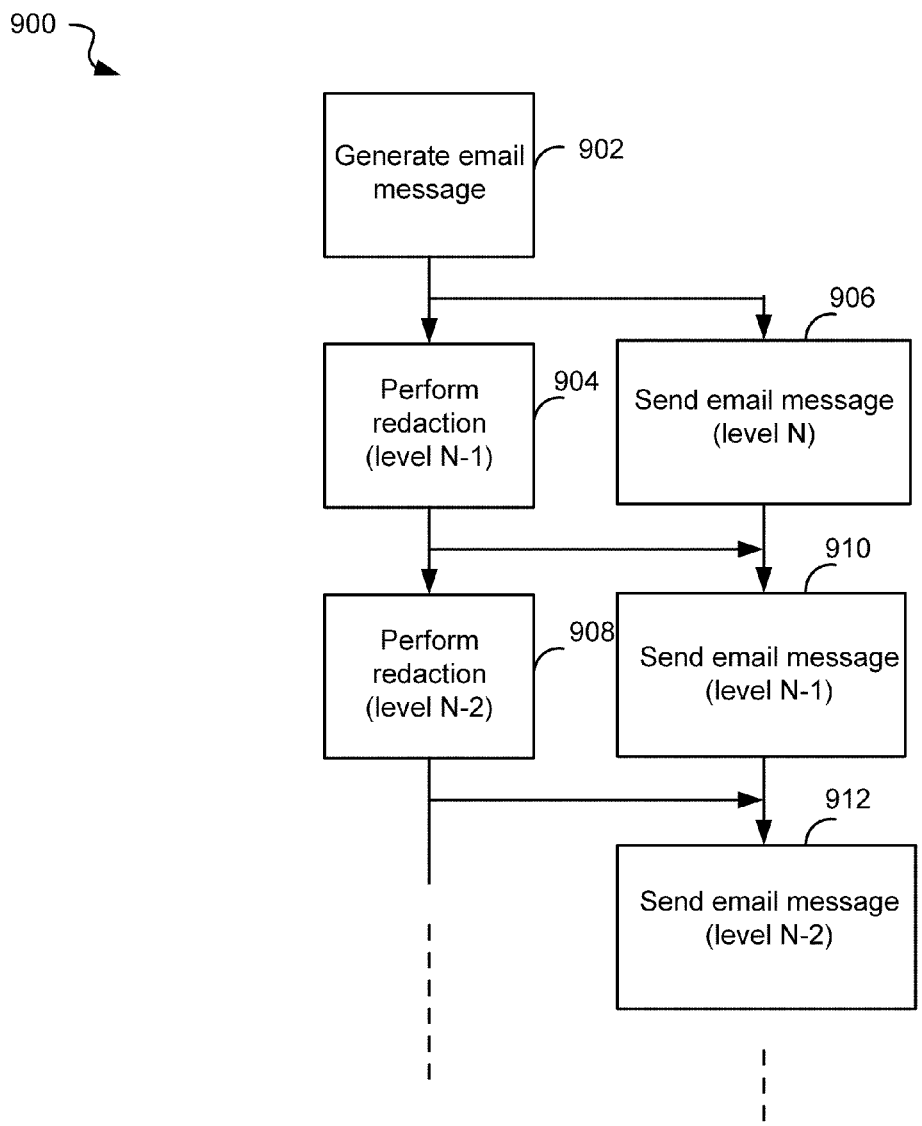
FIG. 9 illustrates the concurrent redaction and sending operations performed by the method of the embodiment of the invention.

The recipients of the email message are organized in a hierarchy in accordance with their clearance levels: a recipient with a higher clearance level occupies a higher level in the hierarchy in comparison to a recipient with a lower clearance level. Without loss of generality, the highest level is labeled N whereas the lowest level is labeled 1. An important aspect of this invention is to perform redaction and email message sending in real time. As a result, two sets of operations are performed concurrently. Diagram 900 displayed in FIG. 9 is used to explain the operation of the method. At start, an email message is generated (box 902). Since no redaction is performed for recipients in level N that are authorized to access all types of information, the email message is sent to recipients in level N. The "Send email message (level N)" operation (box 906) is performed concurrently with performing redaction for level N−1 recipients (box 904). The sequence of operations repeats with two concurrent operations. For example, "Perform redaction (level N−2)" operation (box 908) and "Send email message (level N−1)" operation (box 910) are carried out concurrently at the next level and so on. The sequence of operations stops when the email message for recipients with the lowest clearance level are sent. Two threads or processes can be used for performing the redaction and the sending of the email message. Computational means for sending the email concurrently with the redacting the marked segments 100 shown in FIG. 5(c) controls the flow of data and control between these two threads (processes) for achieving the desired concurrency of operations.

Thus, for a hierarchical (ordered) list of clearance levels of recipients we can save processing time by handling the highest clearance level first, and then moving to the lower clearance levels. For explaining the technique let us consider a system with three clearance levels for the recipients of the email message: SECRET, CONFIDENTIAL and UNCLASSIFIED. SECRET is the highest clearance level followed by CONFIDENTIAL and UNCLASSIFIED. From the original marked up email message the method redacts any segment that recipients with a SECRET clearance level cannot not see. Typically, as in the example email nothing is redacted for the recipient with the highest clearance level. This message is then sent to the recipients with a SECRET clearance level. While the send process is proceeding for the recipients with the SECRET clearance level, this version of the email message is being used as the basis for generating another version of the email message for the recipients with a CONFIDENTIAL clearance level. In the example email message, the segments with a SECRET classification would be redacted. The resulting email message is then sent to recipients with a CONFIDENTIAL clearance level. While the send process is proceeding, the last version of the email message is being used as a basis for generating yet another version of the email message for recipients with an UNCLASSIFIED clearance level. This version of the email message is obtained by redacting any segment a recipient with an UNCLASSIFIED clearance level cannot see. In the example only the segments with a CONFIDENTIAL classification are redacted as the segments with a SECRET classification have already been redacted. The resulting email message is then sent to the recipients with the UNCLASSIFIED clearance level.

The redaction process that replaces text with black squares can be time consuming when enumerating over a large segment of text. If we use the original message as a basis for each version of the document then we will be doing this costly redaction process many times. This is effectively addressed by using the multi-level redaction process described earlier.

In an alternate embodiment of the invention, classification of the segments of an email message is performed on the fly by the Document analysis module 92 that uses the AI system 90. As the user types, the Document analysis module 92 scans the words typed, and uses the AI system 90 to analyse them in the context of the previously entered content, and decides what classification option is appropriate to apply. When the current segment of the email message, such as a paragraph, is filled in with the desired words by the sender of the email message, the results of the analysis performed by the AI module are used by the Auto-classification module 94 to automatically classify the segment. Markings corresponding to this classification are automatically inserted at the beginning of the segment of the email message. The sender of the email message still has full control over the classification by having the ability to modify or delete the markings inserted automatically by the system, if desired.

Figure 10:
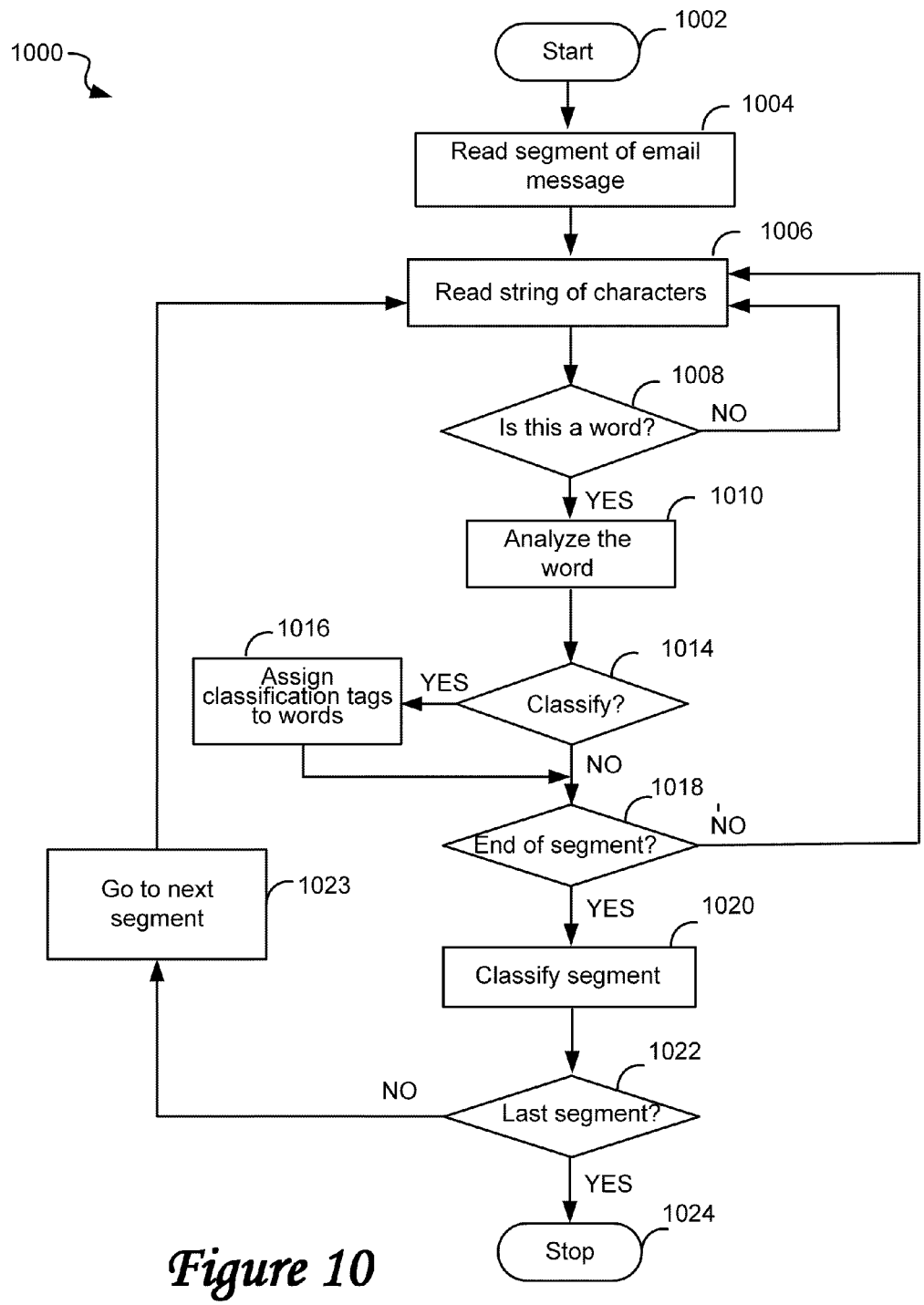
FIG. 10 shows a flowchart 1000 illustrating a method for classifying segments of an email message by using an Artificial Intelligence system according to yet another embodiment of the invention.

FIG. 10 shows a flowchart 1000 illustrating a method for classifying segments of the email message by using the Artificial Intelligence system 90. Upon start (box) 1002, the procedure 1000, goes to the beginning of the first segment of an email message (box 1004) and reads the string of characters (box 1006). After reading every character the procedure checks whether or not the string is a word (box 1008). If not, the procedure exits "NO" from box 1008 and goes back to the input of box 1006. Otherwise, the procedure exits 'YES' from box 1010 and analyzes the word (box 1010) by using the AI system 90. Whether the word needs to be classified is checked next (box 1014). If so, the procedure 1000 exits 'YES' from box 1014, assigns classification tags to the words (box 1016) and goes to the entry of box 1018. Otherwise, the procedure 1000 exits 'NO' from box 1014 and checks whether the end of the segment of the email message is reached (box 1018). If not, the procedure 100 loops back to the entry of box 1006. Otherwise, it classifies the segment (box 1020) and checks whether the segment that was checked is the last segment in the email message (box 1022). If not, the procedure 1000 goes to the next segment of the email message (box 1023) and loops back to the entry of box 1006. Otherwise, the procedure 1000 exits (box 1024).

The AI-based technique is extended to include verification and redaction of words concurrently in an embodiment of the invention described earlier. This aids in speeding up the operations. When a new email message is being created the system checks all the recipients of the email message. While the sender of the email message is typing the message the system checks content of the email message in the background in real time. This is achieved by using two threads or processes, one devoted to the reading of the string of characters in the email message as they are being typed in and the other performing checking of the message. Since typing by a human is slow compared to the speed of operations performed by a CPU, the CPU idle cycles are effectively utilized for performing analysis of the words, as well as classification and selective redactions of segments of the email message. The redaction of text and the creation of redacted version(s) of the email message are thus performed in background.

Consider an example, in which a rule capturing a company policy states that no credit card numbers should be sent via email messages to external recipients. The email message is being typed in to be sent to at least one external recipient as well as some internal recipients. After the sender of the email message types a credit card number, the word is highlighted by using the results of the analysis of the word performed by the Document analysis module 92. If the sender of the email message moves the mouse over the credit card number, a message such as "Credit card number will be redacted for external recipients" is displayed. The analysis is performed concurrently with the writing of the email message by the sender of the email message. Also occurring at the same time in the background is the creation of a version of the email message that has the credit card number redacted. This version of the email message will be ready to be sent to the external recipient when the sender of the email message hits the "Send" button. As a result, there will be no delay in sending the message due to redaction.

Although specific embodiments of the invention have been described in detail, it should be understood that the described embodiments are intended to be illustrative and not restrictive.

Various changes and modifications of the embodiments shown in the drawings and described in the specification may be made within the scope of the following claims without departing from the scope of the invention in its broader aspect. The embodiments of the invention can be adapted for example to enforce parental control over various kinds of documents. Confidential material from a technical document can be automatically redacted for a company sending out technical reports to its clients or collaborators. Parallel processing achieved through the use of multicore CPUs can be used for effectively improving the speed of operations. Each core may be devoted for processing a specific version of the email message when multiple versions need to be generated.

Although the embodiments of the invention have been described in detail, it will be apparent to one skilled in the art that variations and modifications to the embodiment may be made within the scope of the following claims.

What is claimed is:

1. A computerized method for classifying and distributing an email message to multiple recipients having different security levels, the method comprising steps of: using at least one hardware processor for performing one or more of the following:
   (a) selecting a segment of the email message;
   (b) automatically analyzing contents of the selected segment in real time by using an artificial intelligence (AI) system, comprising analyzing a newly typed string of characters of the segment in real time in the context of the previously entered content of the segment;
   (c) automatically classifying the segment, based on results of the analysis performed by the artificial intelligence system, and in accordance with a set of classification options characterizing a type of information contained in the segment;
   (d) automatically marking the segment in accordance with a respective classification option, producing a marked segment;
   (e) automatically classifying the email message based on classifications of segments of the email message;
   (f) automatically redacting the email message in real time in accordance with a respective clearance level of a recipient of the email message, producing a redacted email message, comprising:
      (i) arranging recipients of the email message in a hierarchy in accordance with respective clearance levels such that a recipient with a higher clearance level occupies a higher level in the hierarchy in comparison to a recipient with a lower clearance level;
      (ii) redacting marked segments for recipients in a particular level in the hierarchy in real time concurrently with the redacting the marked segments for recipients at an immediate lower level in the hierarchy; and
   (g) distributing the redacted email message to the recipients of a particular level in the hierarchy concurrently with the redacting marked segments for the recipients at the immediate lower level in the hierarchy.

2. The method of claim 1, wherein the step (f) is performed concurrently with writing the email message by a sender of the email message.

3. The method of claim 1, wherein the step (b) further comprises identifying a word in the string of characters, comparing the identified word with a predetermined list of words, or combinations thereof including synonyms, and making a decision based on a match, or a degree of the match, between the word and the predetermined list of words, how the word should be classified.

4. The method of claim 3, further comprising assigning respective classification tags to words in the segment of the email message.

5. The method of claim 1, wherein the step (f) further comprises determining the clearance level of the recipient of the email message by applying a set of rules.

6. The method of claim 5, further comprising:
   introducing the set of rules for mapping a category of the recipient of the email message to the clearance level of the recipient, the category characterizing a company and a group within the company to which the recipient belongs; and
   determining the clearance level of the recipient by using the set of rules.

7. The method of claim 1, wherein the email message is formatted in Extensible Markup Language (XML) format.

8. The method of claim 1, wherein the redacting comprises removing or excluding the segment.

9. The method of claim 1, wherein the AI is a decision tree AI system, comprising decision nodes and conclusion nodes, each decision node having outcomes connecting the decision node to another decision node or to a conclusion node.

10. The method of claim 1, wherein the steps (f) and (g) are performed by using two threads in a multicore processor environment.

11. The method of claim 10, wherein the step (b) is performed by using yet another thread in the multicore processor environment.

12. A computerized system for classifying and distributing an email message to multiple recipients having different security levels, the system comprising:
   at least one processor;
   a memory device having computer readable instructions stored thereon for execution by the at least one processor, causing the at least one processor to:
   (a) select a segment of the email message;
   (b) automatically analyze contents of the selected segment in real time by using an artificial intelligence (AI) system, comprising analyzing a newly typed string of characters of the segment in real time in the context of the previously entered content of the segment;
   (c) automatically classify the segment, based on results of the analysis performed by the artificial intelligence system, and in accordance with a set of classification options characterizing a type of information contained in the segment;
   (d) automatically mark the segment in accordance with a respective classification option to produce a marked segment;
   (e) automatically classify the email message based on classifications of segments of the email message;
   (f) automatically redact the email message in real time in accordance with a respective clearance level of a recipient of the email message, producing a redacted email message, comprising:
      (i) arranging recipients of the email message in a hierarchy in accordance with respective clearance levels such that a recipient with a higher clearance level occupies a higher level in the hierarchy in comparison to a recipient with a lower clearance level;
      (ii) redacting marked segments for recipients in a particular level in the hierarchy in real time concurrently with the redacting the marked segments for recipients at an immediate lower level in the hierarchy; and
   (g) distribute the redacted email message to the recipients of a particular level in the hierarchy concurrently with the redacting marked segments for the recipients at the immediate lower level in the hierarchy.

13. The system of claim 12, wherein the computer readable instructions further cause the at least one processor to automatically redact the email message concurrently with writing the email message by a sender of the email message.

14. The system of claim 12, wherein the computer readable instructions further cause the at least one processor to identify a word in the string of characters, compare the identified word with a predetermined list of words, or combinations thereof including synonyms, and make a decision based on a match, or a degree of the match, between the word and the predetermined list of words, how the word should be classified.

15. The system of claim 14, wherein the computer readable instructions further cause the at least one processor to assign respective classification tags to words in the segment of the email message.

16. The system of claim 12, wherein the computer readable instructions further cause the at least one processor to determine the clearance level of the recipient of the email message by applying a set of rules.

17. The system of claim 16, wherein the computer readable instructions further cause the at least one processor to:
    introduce the set of rules for mapping a category of the recipient of the email message to the clearance level of the recipient, the category characterizing a company and a group within the company to which the recipient belongs; and
    determine the clearance level of the recipient by using the set of rules.

18. The system of claim 12, wherein the email message is formatted in Extensible Markup Language (XML) format.

19. The system of claim 12, wherein the computer readable instructions further cause the at least one processor to redact the segment by removing or excluding the segment.

20. The system of claim 12, wherein the AI is a decision tree AI system, comprising decision nodes and conclusion nodes, each decision node having outcomes connecting the decision node to another decision node or to a conclusion node.

21. The system of claim 12, wherein the computer readable instructions further cause the at least one processor to automatically redact and distribute by using two threads in a multicore processor environment.

22. The system of claim 21, wherein the computer readable instructions further cause the at least one processor to automatically analyze by using yet another thread in the multicore processor environment.

\* \* \* \* \*

UNITED STATES PATENT AND TRADEMARK OFFICE
CERTIFICATE OF CORRECTION

| | | |
|---|---|---|
| PATENT NO. | : 8,407,805 B2 | Page 1 of 1 |
| APPLICATION NO. | : 12/715729 | |
| DATED | : March 26, 2013 | |
| INVENTOR(S) | : Connor Warrington et al. | |

It is certified that error appears in the above-identified patent and that said Letters Patent is hereby corrected as shown below:

In the Claims

Column 13, line 19, "performing one or more of the" should read --performing the--.

Signed and Sealed this
Seventh Day of October, 2014

Michelle K. Lee
*Deputy Director of the United States Patent and Trademark Office*